US010632605B2

United States Patent
Tanabe et al.

(10) Patent No.: US 10,632,605 B2
(45) Date of Patent: Apr. 28, 2020

(54) WORK TOOL

(71) Applicant: HITACHI KOKI CO., LTD., Tokyo (JP)

(72) Inventors: Daijiro Tanabe, Ibaraki (JP); Goya Fujimoto, Ibaraki (JP); Ryusuke Kobayashi, Ibaraki (JP); Kuniaki Kanbe, Ibaraki (JP); Shinichirou Satou, Ibaraki (JP)

(73) Assignee: KOKI HOLDINGS CO., LTD., Tokyo (JP)

( * ) Notice: Subject to any disclaimer, the term of this patent is extended or adjusted under 35 U.S.C. 154(b) by 612 days.

(21) Appl. No.: 15/307,377

(22) PCT Filed: Apr. 30, 2015

(86) PCT No.: PCT/JP2015/063010
§ 371 (c)(1),
(2) Date: Oct. 28, 2016

(87) PCT Pub. No.: WO2015/166995
PCT Pub. Date: Nov. 5, 2015

(65) Prior Publication Data
US 2017/0043466 A1 Feb. 16, 2017

(30) Foreign Application Priority Data

Apr. 30, 2014 (JP) .................................. 2014-093640
Apr. 30, 2014 (JP) .................................. 2014-093641

(51) Int. Cl.
B25D 17/24 (2006.01)
B25D 16/00 (2006.01)
(Continued)

(52) U.S. Cl.
CPC ............. *B25D 17/24* (2013.01); *B23D 49/16* (2013.01); *B23D 51/00* (2013.01); *B25D 16/00* (2013.01);
(Continued)

(58) Field of Classification Search
CPC ....... B25F 5/006; B25D 17/24; B25D 17/245; B25D 17/043; B25D 2217/0073;
(Continued)

(56) References Cited

U.S. PATENT DOCUMENTS 2,102,603 A * 12/1937 Giosue Pinazza ... B25D 11/066
173/49
2,872,914 A * 2/1959 Fahrni .................. B25D 11/068
173/100
(Continued)

FOREIGN PATENT DOCUMENTS

CN 1883885 12/2006
CN 101462265 6/2009
(Continued)

OTHER PUBLICATIONS

"International Search Report (Form PCT/ISA/210) of PCT/JP2015/063010", dated Jul. 7, 2015, with English translation thereof, pp. 1-4.
(Continued)

*Primary Examiner* — Stephen F. Gerrity
*Assistant Examiner* — Joshua G Kotis
(74) *Attorney, Agent, or Firm* — JCIPRNET

(57) ABSTRACT

The disclosure provides a work tool having an electric motor, a power transmission means that receives motive power from the electric motor and transmits the motive power to a tip tool, a gear housing for accommodating at least a portion of the power transmission means, weights swingably supported on the gear housing, and coil springs
(Continued)

that function as an urging means for urging the weights such that the weights are located at an initial neutral position, wherein the weights and the coil springs are provided respectively on the two sides of the gear housing so as to put the power transmission means therebetween, and a rotational support axle is provided that functions as a connecting means for connecting the weights provided on both sides of the gear housing so as to connect the weights such that the weights swing integrally.

14 Claims, 12 Drawing Sheets

(51) Int. Cl.
B25F 5/00 (2006.01)
B23D 49/16 (2006.01)
B23D 51/00 (2006.01)

(52) U.S. Cl.
CPC ........ *B25F 5/006* (2013.01); *B25D 2211/068* (2013.01); *B25D 2217/0092* (2013.01); *B25D 2250/121* (2013.01); *B25D 2250/245* (2013.01); *B25D 2250/391* (2013.01)

(58) Field of Classification Search
CPC .... B25D 2217/0076; B25D 2217/0092; B25D 2217/008; B25D 2217/0084; B25D 2217/0088; B25D 2250/371–381; B23Q 11/0032; B23Q 11/0035; F16F 7/116; F16F 15/22–226; F16F 15/28
USPC .......... 173/210–212, 170, 117, 162.1–162.2; 188/380; 267/137
See application file for complete search history.

(56) References Cited

U.S. PATENT DOCUMENTS

| | | | | |
|---|---|---|---|---|
| 7,451,833 B2* | 11/2008 | Hahn | ...................... | B25D 17/24 173/104 |
| 7,500,527 B2* | 3/2009 | Fischer | ................ | B25D 17/043 173/162.2 |
| 7,938,196 B2* | 5/2011 | Fischer | ................ | B25D 17/043 173/162.2 |
| 8,307,910 B2* | 11/2012 | Holmes | ................ | B23D 49/165 173/19 |
| 2004/0082283 A1* | 4/2004 | Lindell | ................... | B24B 23/02 451/343 |
| 2007/0074408 A1* | 4/2007 | Zhang | ................... | B23D 51/10 30/392 |
| 2008/0047723 A1* | 2/2008 | Kamegai | .............. | B25D 11/062 173/109 |
| 2008/0277128 A1* | 11/2008 | Satou | ..................... | B25D 17/24 173/48 |
| 2009/0151967 A1 | 6/2009 | Haas et al. | | |
| 2009/0218114 A1* | 9/2009 | Ohlendorf | .............. | B23D 51/00 173/211 |
| 2009/0223693 A1* | 9/2009 | Aoki | ...................... | B25D 16/00 173/211 |
| 2010/0038105 A1 | 2/2010 | Kikuchi et al. | | |
| 2010/0307783 A1* | 12/2010 | Baumann | ................ | B25D 17/24 173/162.2 |
| 2011/0139477 A1* | 6/2011 | Kuhnle | ................... | B25D 17/24 173/162.2 |
| 2012/0067605 A1* | 3/2012 | Furusawa | ............ | B25D 17/043 173/162.2 |
| 2012/0118598 A1* | 5/2012 | Iio | .......................... | B25D 17/24 173/162.1 |
| 2012/0125649 A1* | 5/2012 | Ohlendorf | .............. | B25D 17/24 173/162.2 |
| 2012/0160532 A1* | 6/2012 | Kurzenberger | ..... | B27B 17/0033 173/162.2 |
| 2012/0227995 A1* | 9/2012 | Diem | ................... | B25D 11/125 173/162.2 |
| 2012/0255753 A1* | 10/2012 | Kuhnle | ................... | B25D 17/24 173/162.2 |
| 2013/0048327 A1* | 2/2013 | Machida | .............. | B25D 11/062 173/162.2 |
| 2015/0328760 A1* | 11/2015 | Ikuta | ..................... | B25D 11/00 173/117 |

FOREIGN PATENT DOCUMENTS

| | | | | |
|---|---|---|---|---|
| CN | 101646529 | | 2/2010 | |
| CN | 102962819 | | 3/2013 | |
| EP | 1415768 | | 5/2004 | |
| EP | 2127821 | A1 * | 12/2009 | ............. B25D 17/24 |
| EP | 2564986 | | 3/2013 | |
| GB | 2086005 | A * | 5/1982 | ........... B25D 17/043 |
| JP | 2007001005 | | 1/2007 | |
| JP | 2008272897 | | 11/2008 | |
| JP | 2009142985 | | 7/2009 | |
| JP | 2013049124 | | 3/2013 | |
| JP | 2014069293 | | 4/2014 | |
| WO | WO-2012045504 | A1 * | 4/2012 | ............. B25D 17/24 |

OTHER PUBLICATIONS

"Search Report of Europe Counterpart Application", dated Nov. 7, 2017, p. 1-p. 7.
"Office Action of China Counterpart Application," with machine English translation thereof, dated Jun. 27, 2018, p. 1-p. 16.

* cited by examiner

WORK TOOL

CROSS-REFERENCE TO RELATED APPLICATIONS

This application is a 371 of international application of PCT application serial no. PCT/JP2015/063010, filed on Apr. 30, 2015, which claims priority benefits of Japan application no. 2014-093640, filed on Apr. 30, 2014, and Japan application no. 2014-093641, filed on Apr. 30, 2014. The entirety of each of the abovementioned patent applications is hereby incorporated by reference herein and made a part of this specification.

BACKGROUND OF THE INVENTION

Field of the Invention

The invention relates to a work tool, and particularly relates to a work tool including a power transmission means that receives motive power from a motor and transmits the motive power to a tip tool.

Description of Related Art

In a work tool provided previously, the work tool includes a power transmission mechanism, such as a reciprocal movement conversion mechanism or a rotation transmission mechanism, in a housing, and includes a vibration-reducing mechanism that exerts control on vibration generated through the power transmission mechanism (see Patent Literature 1, for example). The vibration-reducing mechanism includes a weight portion that is swingably supported and an urging means. The urging means includes a plate spring, a spring, or the like that urges the weight portion to make the weight portion return to an initial neutral position.

PRIOR ART LITERATURE

Patent Literature

[Patent Literature 1] Japanese Patent Publication No. 2008-272897

SUMMARY OF THE INVENTION

Problem to be Solved

However, in the conventional art, a vibration-reducing mechanism is located on a central axis of a tip tool, and disposed between a striking mechanism in a housing and a handle. Therefore, a total length becomes longer. Accordingly, Patent Literature 1 also proposes to dispose a vibration-reducing mechanism including a weight portion and an urging means on left and right sides or an upper surface of the housing. However, in correspondence with a direction where vibrations are generated, the weight portion disposed to the left and right sides or the upper surface may swing abruptly. Therefore, a vibration damping effect is reduced.

In view of the above, the invention is set to solve the issue and provides a work tool that ensures the vibration damping effect even if the vibration-reducing mechanism is disposed to the side surface of the housing to reduce the total length of the device. Besides, the invention is also set to provide a work tool capable of damping vibrations in a preferable efficiency regardless of strength of the vibrations.

Technical Means for Solving the Issue

To solve the issue, a work tool of the invention has: a motor; a power transmission means, receiving motive power of the motor and transmitting the motive power to a tip tool; a housing, accommodating at least a portion of the power transmission means; weights, swingably supported by the housing; and urging means, urging the weights such that the weights are located at an initial neutral position. For the work tool, the weight and the urging means are respectively disposed to two sides of the housing to put the power transmission means therebetween, and the work tool has a connection means connecting the weights respectively disposed to the two sides of the housing, so as to swing integrally.

Inventive Effect

According to the invention, even if the vibration-reducing mechanism is disposed to the side surface of the housing to reduce the total length of the device, the connection means is used to integrate the weights disposed to the two sides of the housing to swing. Therefore, the vibration damping effect is ensured.

DESCRIPTION OF THE EMBODIMENTS

Hereinafter, embodiments of the invention are described with reference to the figures. In the following description, the same or equivalent forming elements, components, processes shown in the respective figures are marked with the same reference symbols. In addition, repeated descriptions are appropriately omitted. Also, in the following descriptions, the vertical direction refers to the directions shown in the figure.

First Embodiment

Figure 1:
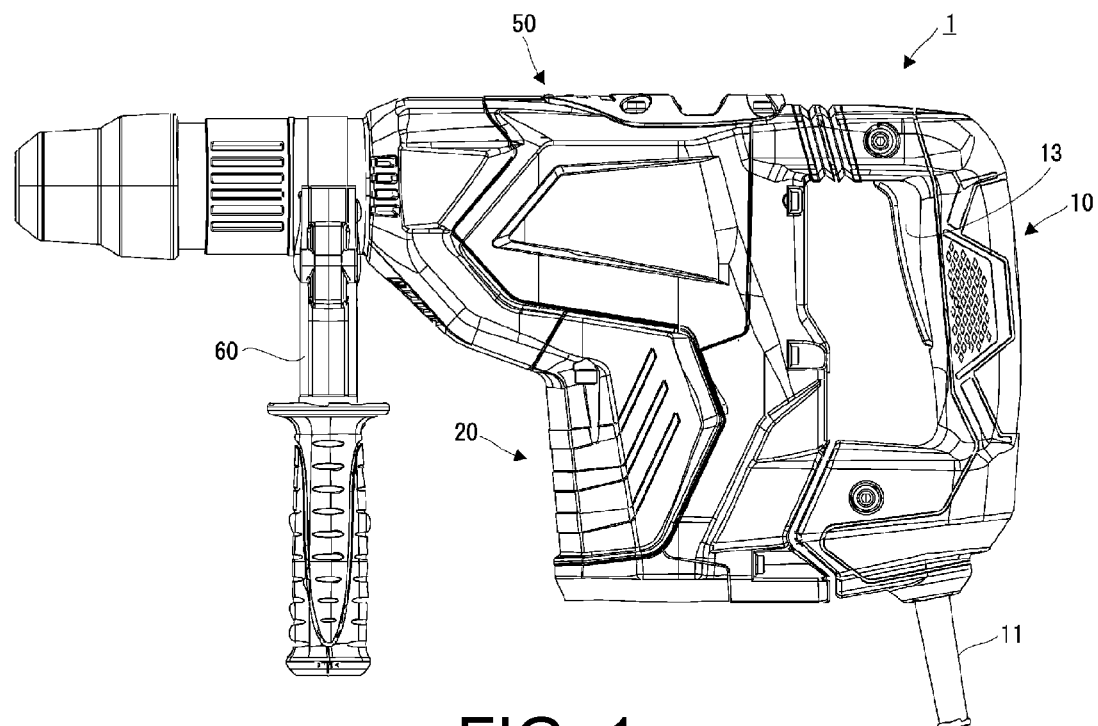
FIG. 1 is a side view illustrating an overall assembly of a first embodiment of a work tool of the invention.
Figure 2:
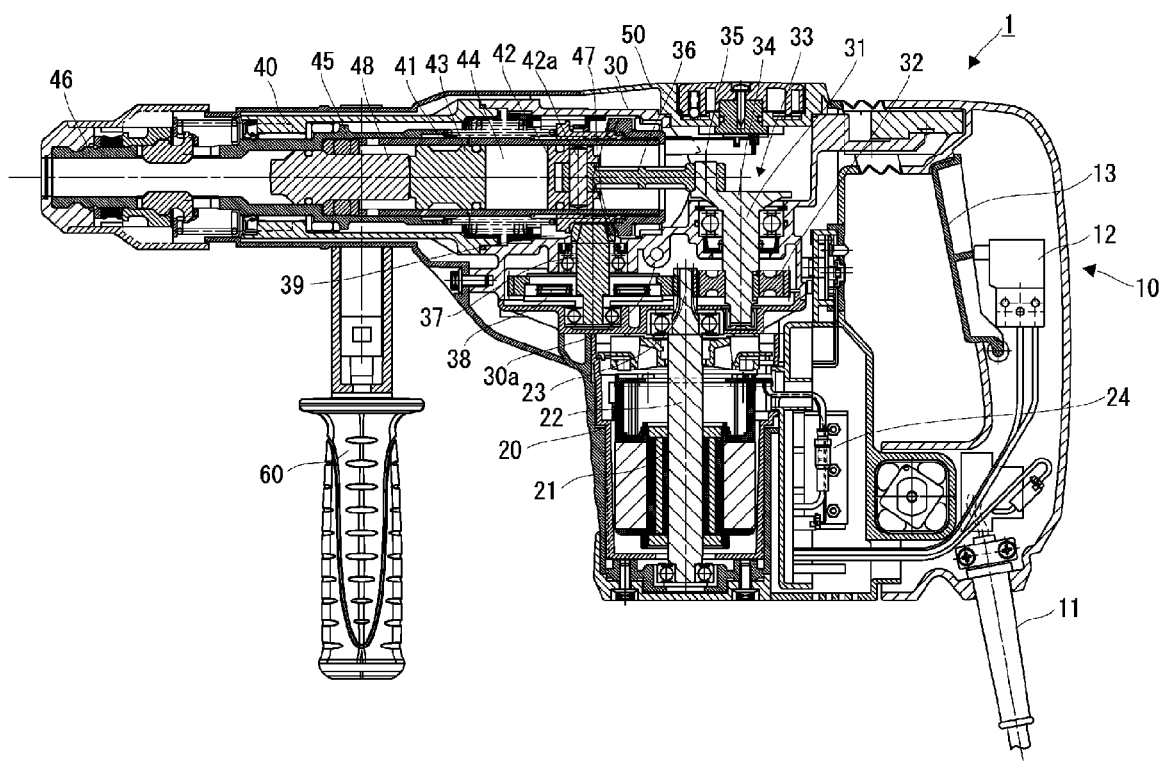
FIG. 2 is a longitudinal cross-sectional view illustrating the overall assembly of the first embodiment of the work tool of the invention.

A work tool 1 of the first embodiment is a striking tool that exerts powerful to-and-fro strikes on a tip tool while operating, or more specifically, a hammer drill as follows. Namely, a drill is mounted to function as a tip tool not shown herein, and the hammer drill exerts powerful to-and-fro strikes on the drill while drilling. Referring to FIGS. 1 and 2, the work tool 1 includes a main handle portion 10, a motor housing 20, a gear housing 30, a strike housing 40, an external housing 50 covering the motor housing 20, the gear housing 30, and the strike housing 40, and a sub-handle portion 60 that are connected with respect to each other. In addition, the embodiment is described by defining the left side in FIGS. 1 and 2 as a front end side mounted with the tip tool, and the right side as a rear end side of the work tool 1.

The main handle portion 10 is disposed at a rear end of the work tool 1 and extends along a direction substantially orthogonal to an axial direction of the tip tool mounted on the front end side of the work tool 1. An electric cable 11 is installed to the main handle portion 10 and a switch mechanism 12 is disposed in the main handle portion 10. Besides, a trigger 13 operable by the user is disposed to the main handle portion 10. The trigger 13 and the switch mechanism 12 are mechanically connected. Accordingly, the work tool 1 is driven by connecting the electric cable 11 to an external electric power source not shown herein and operating the trigger 13.

The motor housing 20 is disposed to a lower portion of a front end side of the main handle portion 10 and accommodates an electric motor 21 as a motive power source. The electric motor 21 includes an output axle 22 outputting a rotational driving force of the electric motor 21. The output axle 22 extends inside the gear housing 30, and a pinion gear 23 is disposed to a front end of the output axle 22.

In the gear housing 30, on a rear end side of the pinion gear 23, a crank axle 31 extending in parallel with the output axle 22 is rotatably supported. A first gear 32 engaged with the pinion gear 23 is coaxially fixed proximate a lower end of the crank axle 31. A movement conversion mechanism 33 is disposed to an upper end portion of the crank axle 31. The movement conversion mechanism 33 includes a crank weight 34, a crank pin 35, and a conrod 36. The crank weight 34 is fixed to an upper end of the crank axle 31. At an end portion of the crank weight 34, the crank pin 35 is disposed upright and centrifugally with respect to the crank axle 31. Moreover, the crank pin 35 is inserted into a rear end of the conrod 36. Therefore, when the crank axle 31 drives by rotation, the conrod 36 moves reciprocally along the axial direction of the tip tool mounted at the front end side of the work tool 1. The crank axle 31 and the movement conversion mechanism 33 are power transmission means that receive motive power of the electric motor 21, transmit the motive power to the tip tool, and convert the rotational driving force generated by the electric motor 21 into reciprocal movement.

Besides, in the gear housing 30, on a front end side of the pinion gear 23, a rotational transmission axle 37 extending in parallel with the output axle 22 is rotatably supported. A second gear 38 engaged with the pinion gear 23 is coaxially fixed to a lower end the rotational transmission axle 37. A first bevel gear 39 is coaxially fixed to an upper end of the rotational transmission axle 37.

The strike housing 40 is disposed to a front end side of the gear housing 30, and is provided with a cylinder 41 extending in a direction substantially orthogonal to the output axle 22 and coplanar with the output axle 22. In the cylinder 41, a piston 42 is disposed to be slidable along an inner circumference of the cylinder 41. A piston pin 42a is disposed in the piston 42, and the piston pin 42a is inserted into a front end of the conrod 36. On a front end side in the cylinder 41, a striking piece 43 is disposed to be slidable along the inner circumference of the cylinder 41. In the cylinder 41, an air chamber 44 is defined between the piston 42 and the striking piece 43.

Besides, in the strike housing 40, a rotational cylinder 45 is rotatably supported, so as to cover an outer circumference of the cylinder 41. The rotational cylinder 45 is more extended toward the front end side than the cylinder 41, and a tool maintaining portion 46 allowing the tip tool to be detachably mounted is disposed to a front end portion of the rotational cylinder 45. A second bevel gear 47 engaged with the first bevel gear 39 is disposed to a rear end portion of the rotational cylinder 45. A central axis of the rotational cylinder 45 is coplanar with the output axle 22. Besides, an intermediate piece 48 slidable along a to-and-fro direction is disposed to a front end side of the striking piece 43 in the rotational cylinder 45. The piston 42, the striking piece 43, and the intermediate piece 48 are power transmission means that receive the motive power of the electric motor 21 and function as a striking mechanism that transmits a striking force to the tip tool mounted at the tool maintaining portion 46. Moreover, the rotational transmission axle 37 and the rotational cylinder 45 are also power transmission means that receive the motive power of the electric motor 21 and transmit the motive power to the tip tool, and function as a rotational transmission mechanism that transmits the rotational driving force to the tip tool mounted at the tool maintaining portion 46.

Figure 3:
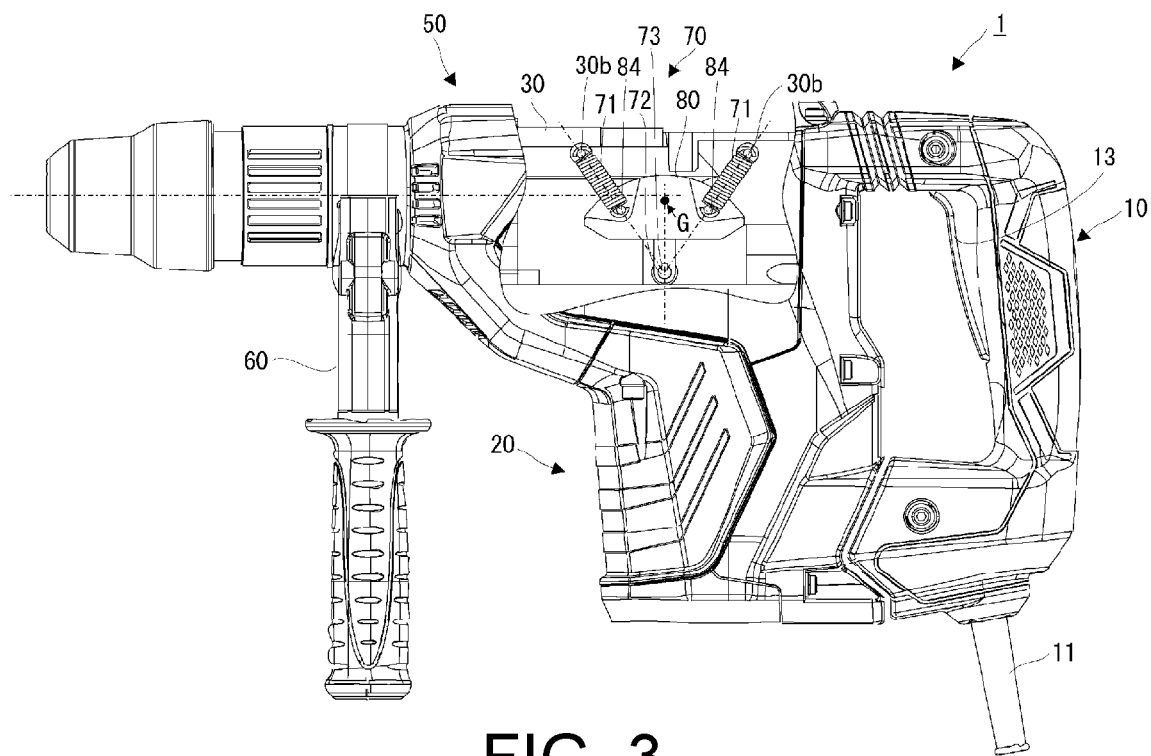
FIG. 3 is a side view illustrating a vibration-reducing mechanism included in the work tool of the first embodiment.
Figure 4:
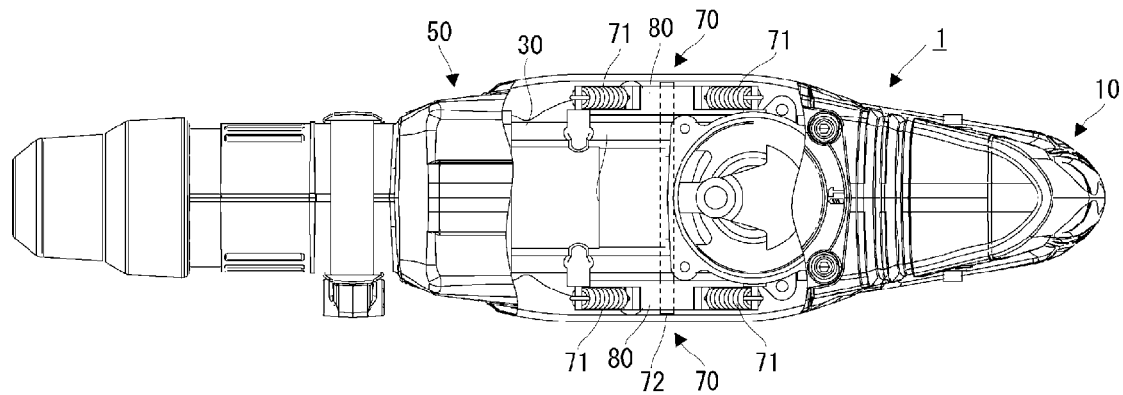
FIG. 4 is a top view illustrating the vibration-reducing mechanism included in the work tool of the first embodiment.

Referring to FIGS. 3 and 4, a vibration-reducing mechanism 70 reducing vibrations generated by driving of the work tool 1 is disposed between the gear housing 30 and the external housing 50. The vibration-reducing mechanism 70 includes weights 80 and coil springs 71. The weights 80 and the coil springs 71 are respectively disposed to opposite positions on two sides of the gear housing 30 to put an axle center of the cylinder 41 therebetween. Besides, in FIGS. 3 and 4, a portion where the external housing 50 is removed is shown to illustrate a state where the vibration-reducing mechanism 70 disposed to the gear housing 30 is exposed.

Figure 5A:
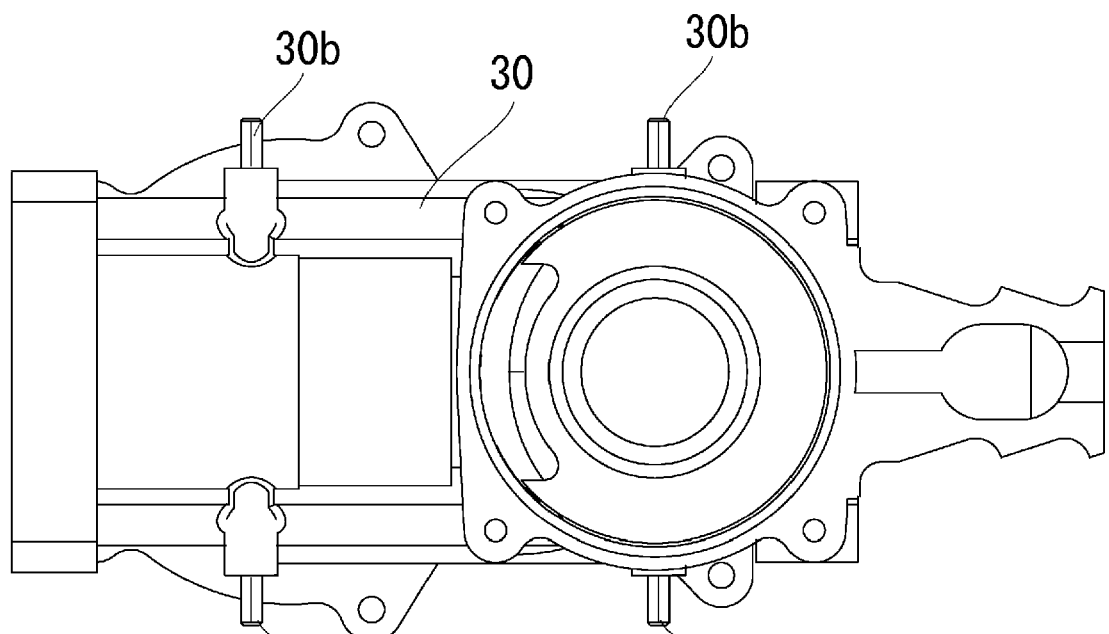
FIGS. 5(a) and 5(b) includes a top view and a side view illustrating a configuration of a gear housing shown in FIG. 2.
Figure 5B:
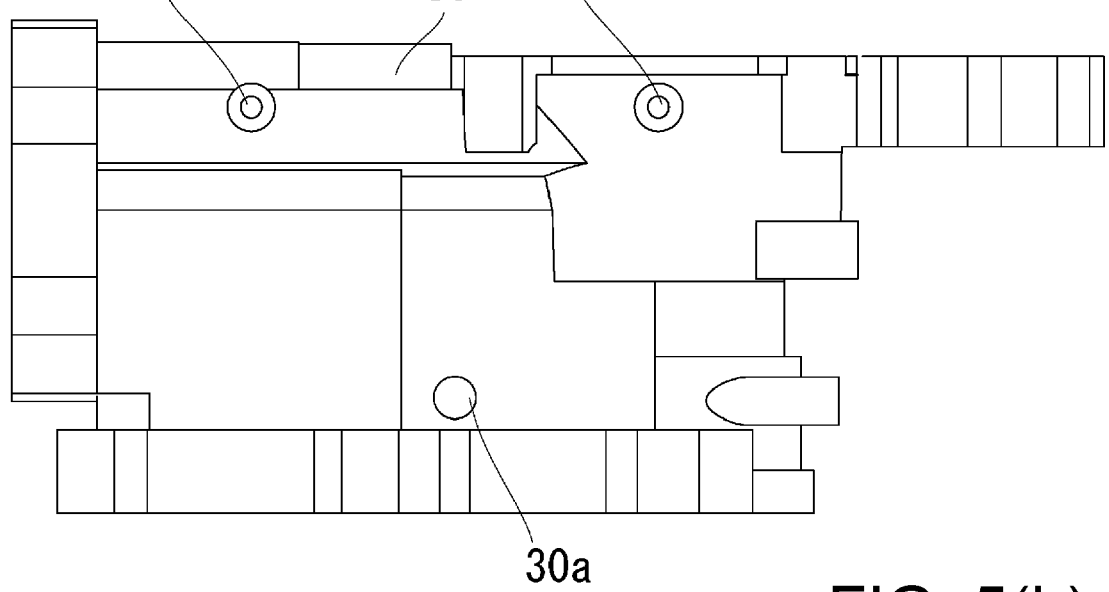

As shown in FIGS. 2 and 5(b), a through hole 30a penetrating through two side surfaces in a direction substantially orthogonal with respect to an axle center of the rotational cylinder 45 is formed in the gear housing 30. In addition, FIG. 5(a) is a top view illustrating the gear housing 30, and FIG. 5 (b) is a side view illustrating the gear housing 30. In this embodiment, the through hole 30a is formed by extending in a direction that is also substantially orthogonal to the output axle 22 of the electric motor 21 and penetrating through left and right side surfaces of the gear housing 30. In addition, as shown in FIG. 2, the through hole 30a is formed above the electric motor 21 and in an area surrounded by the crank axle 31 as a portion of the movement conversion mechanism 33, the rotational transmission axle 37 as a portion of the rotational transmission mechanism, and the axle center of the rotational cylinder 45.

Figure 6:
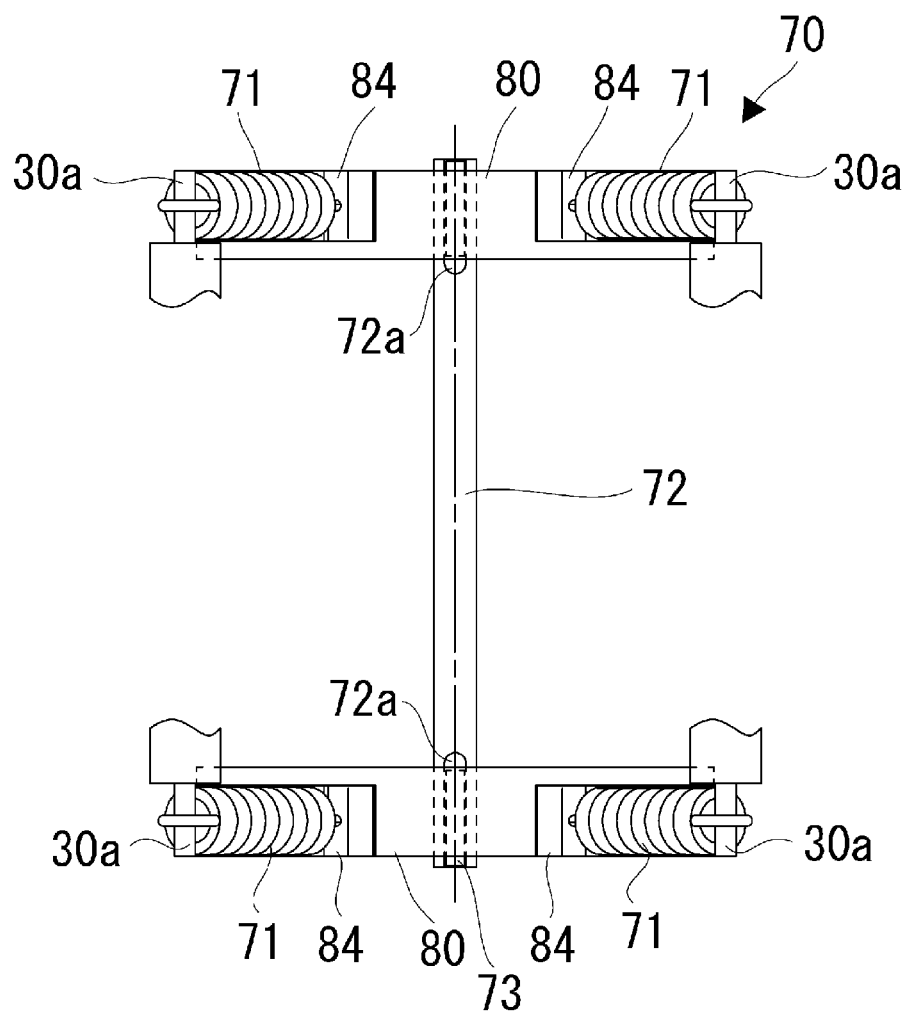
FIG. 6 is an enlarged top view illustrating a configuration of the vibration-reducing mechanism shown in FIGS. 3 and 4.

As shown in FIGS. 3 and 4, a rotational support axle 72 is rotatably inserted into the through hole 30a. Two ends of the rotational support axle 72 respectively protrude from left and right sides of the gear housing 30. As shown in FIG. 6, the weights 80 are respectively fixed to the two protruding ends of the rotational support axle 72. Therefore, the weights 80 respectively disposed to the two sides of the gear housing 30 are connected and integrated by the rotational support axle 72, and are rotatably supported with the rotational support axle 72 as the center. Besides, FIG. 6 is a view observing the weights 80 respectively fixed at the two ends of the rotational support axle 72 from a top side.

Figure 7:
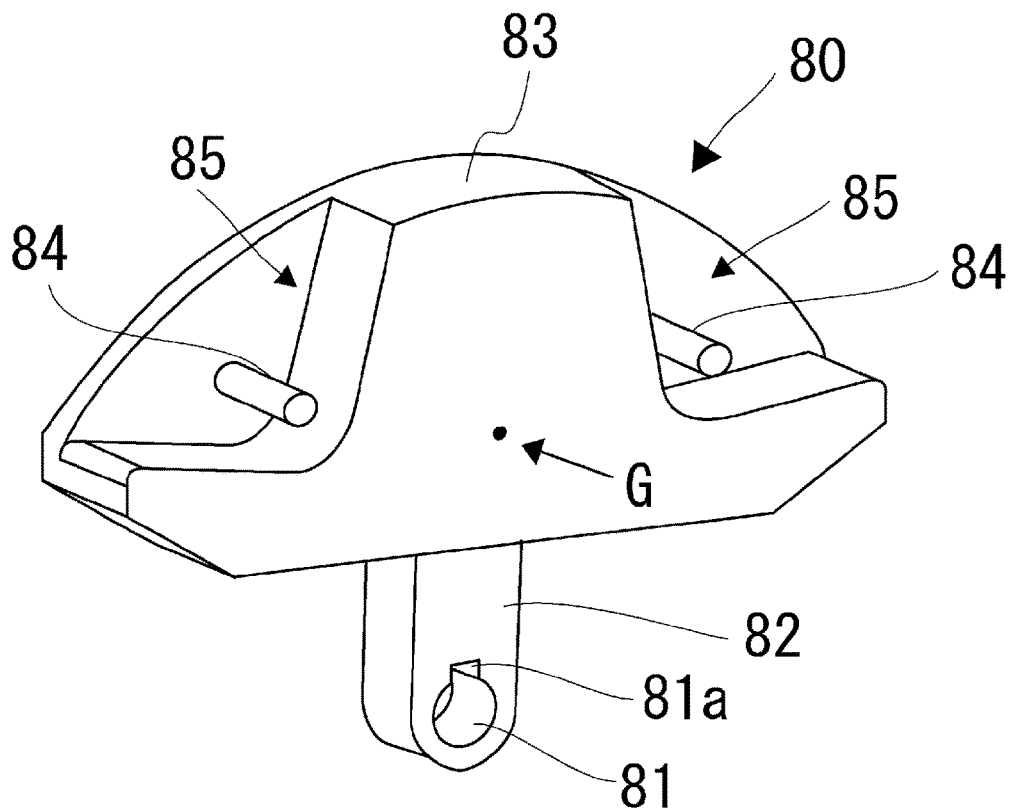
FIG. 7 is a perspective view illustrating a configuration of a weight shown in FIGS. 3 and 4.
Figure 8A:
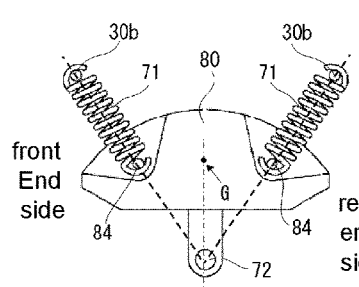
FIGS. 8(a)~8(d) is a view illustrating operations of the vibration-reducing mechanism shown in FIGS. 3 and 4.
Figure 8B:
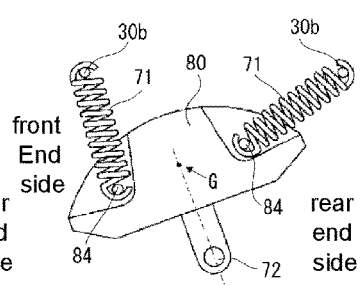
Figure 8C:
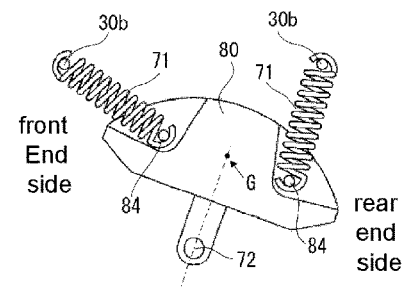
Figure 8D:
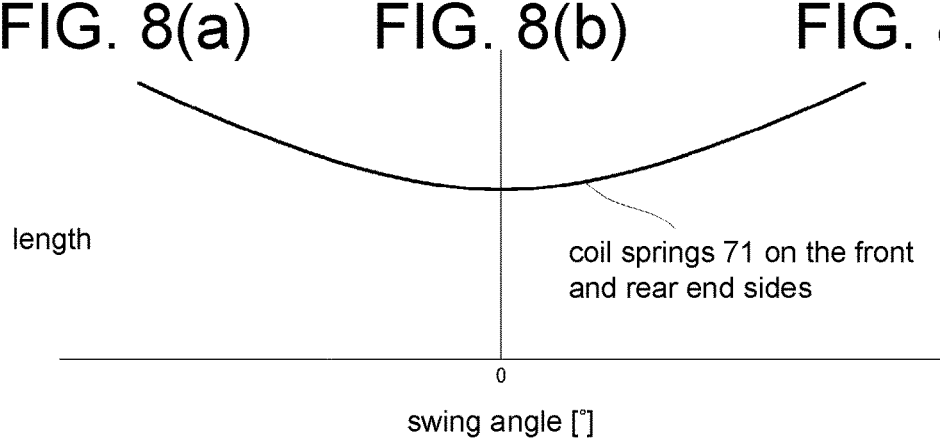
Figure 9A:
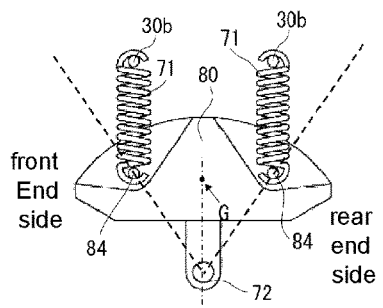
FIGS. 9(a)~9(d) is a view illustrating operations of the vibration-reducing mechanism when a housing locking portion shown in FIG. 3 is disposed to another position.
Figure 9B:
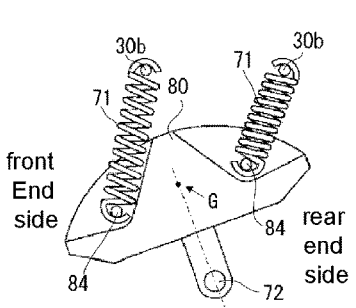
Figure 9C:
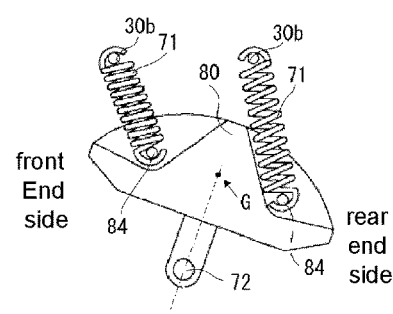
Figure 9D:
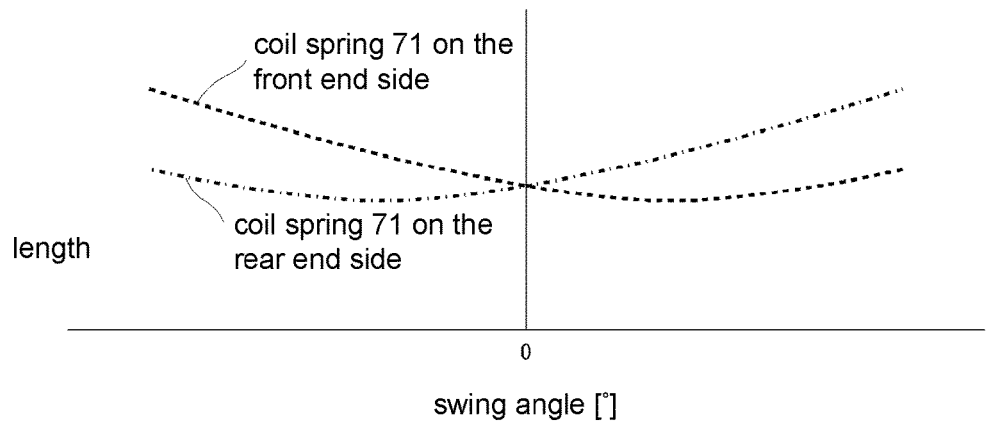

Referring to FIG. 7, the weight 80 includes a support portion 82 and a weight portion 83. An end portion of the support portion 82 is formed with a fixing hole 81 for the end portion of the rotational support axle 72 to be inserted and fixed. The weight portion 83 is disposed to another end side (a release end side) of the support portion 82. The support portion 82 and the weight portion 83 are integrated. A key groove 81a parallel to an axle center of the fixing hole 81 is formed at the fixing hole 81. Key grooves 72a parallel to an axle center of the rotational support axle 72 are respectively formed at the two end portions of the rotational support axle 72. By inserting the end portion of the rotational support axle 72 into the fixing hole 81 and inserting a key 73 for engagement into the key groove 81a of the fixing hole 81 and the key groove 72a of the rotational support axle 72, the rotational support axle 72 and the support portion 82 (the weight 80) are integrated in terms of rotational direction. Thus, the rotational support axle 72 functions as a connection means, and is connected with the weights 80 disposed to positions of the two sides of the gear housing 30 and integrated in terms of rotational direction.

The weight portion 83 is a fan-shaped plate. The fixing hole 81 serves as a center (fan axle) of the weight portion 83, and the weight portion 83 is substantially perpendicular to the axle center of the fixing hole 81. In addition, in the weight portion 83, rod-shaped weight locking portions 84 parallel to the axle center of the fixing hole 81 are respectively disposed to positions linearly symmetrical with respect to a line connecting a gravity center G of the weight 80 and the axle center of the fixing hole 81. The weight locking portion 84 locks a bending portion formed at one end of the coil spring 71. In the weight portion 83, a thinner thickness portion 85 is formed at a part where the weight locking portion 84 is disposed upright. A thickness of the thinner thickness portion 85 is configured to be greater than a diameter of the coil spring 71.

As shown in FIGS. 3 and 5, in the gear housing 30, housing locking portions 30b are formed by protruding from the side surfaces. The housing locking portions 30b are respectively disposed in correspondence with the weight locking portions 84 of the weight 80 and lock bending portions formed at another ends of the coil springs 71. The coil spring 71 is an extension spring and stretched between the weight locking portion 84 and the housing locking portion 30b. In a state when an external force is not in effect, as shown in FIG. 3, the weight 80 is located at an initial neutral position where the line connecting the gravity center G of the weight 80 and the axle center of the fixing hole 81 is substantially orthogonal with respect to the axle center of the rotational cylinder 45. In a state that the weight 80 is located at the initial neutral position, the case locking portion 30b and the weight locking portion 84 are disposed on a same normal line of the axle center of the fixing hole 81, namely the rotational support axle 72. Consequently, at the initial neutral position, the housing locking portions 30b are respectively formed at the positions lineally symmetrical with respect to the line connecting the gravity center G of the weight 80 and the axle center of the fixing hole 81. Thus, by utilizing a urging force in a contracting direction of the coil spring 71, the weight 80 may be easily located at the initial neutral position. Besides, in the state that the weight 80 is located at the initial neutral position, as illustrated in the side observation shown in FIG. 3, the gravity center G of the weight 80 is disposed near the axle center of the piston 42 functioning as a portion of the striking mechanism. Therefore, the vibration generated by the striking mechanism is able to be effectively controlled.

In a state that the coil string 71 is stretched between the weight locking portion 84 and the housing locking portion 30b, the weight locking portion 84 is disposed to the thinner thickness portion 85. Thus, as shown in FIGS. 4 and 6, in an axial direction of the rotational support axle 72 serving as a swing axle of the weight 80, the coil spring 71 is located within an area of the weight 80, namely within a thickness of the weight 80. Therefore, relative to the weight 80, the coil spring 71 does not protrude toward the axial direction of the rotational support axle 72. As a result, the vibration-reducing mechanism 70 may be more compact in the axial direction of the rotational support axle 72, and may be disposed by simply utilizing a small space formed between the gear housing 30 and the external housing 50.

In the following, an operation of the work tool 1 of the first embodiment is described in detail.

In a state that the main handle portion 10 and the sub-handle portion 60 are held by hands, the work tool 1 is pressed against a cutting material not shown herein, and the trigger 13 is pulled. Accordingly, an electric power provided to the electric motor 21, so as to drive the electric motor 21 to rotate. The rotational driving force of the electric motor 21 is transmitted to the crank axle 31 through the output axle 22, the pinion gear 23, and the first gear 32. Rotation of the crank axle 31 is converted into a reciprocal movement of the piston 42 in the cylinder 41 through the crank weight 34, the crank pin 35, and the conrod 36 constituting the movement conversion mechanism 33. Moreover, the reciprocal movement of the piston 42 makes an air pressure in the air chamber 44 repetitively increase and decrease, thereby providing a striking force to the striking piece 43. The striking piece 43 moves forward and collides with a rear end of the intermediate piece 48. The striking force is transmitted to the tip tool mounted at the tool maintaining portion 46 by the intermediate piece 48. In addition, a central axis of the tip tool mounted at the tool maintaining portion 46 is consistent with the axle center of the piston 42 functioning as a portion of the striking mechanism, so the striking force may be effectively transmitted from the striking mechanism to the tip tool.

Besides, the rotational driving force of the electric motor 21 is transmitted to the rotational transmission axle 37 through the output axle 22, the pinion gear 23, and the second gear 38. In addition, rotation of the rotational transmission axle 37 is transmitted to the rotational cylinder 45 through the first bevel gear 39 and the second bevel gear 47, so as to rotate the rotational cylinder 45. Through rotation of the rotational cylinder 45, a rotational force is provided to the tip tool mounted at the tool maintaining portion 46. The rotational force and the striking force are used and provided to the tip tool mounted at the tool maintaining portion 46, so as to crush the cutting material.

Besides, when the work tool 1 is in operation, the reciprocal movement of the striking piece 43 may result in vibrations with a substantially fixed cycle. In addition, the vibrations are transmitted to the gear housing 30 accommodating the striking piece 43. The vibrations transmitted to the gear housing 30 are transmitted to the rotational support axle 72 rotatably supported by the gear housing 30. When the vibrations are transmitted to the rotational support axle 72, the weight 80 may swing with the rotational support axle 72 as the center.

FIGS. 8(*a*)~8(*d*) illustrates an example described as follows. Namely, as shown in FIG. 8(*a*), at the initial neutral position, the housing locking portions 30*b* on the front end side and the rear end side are disposed above the respective weight locking portions 84 on the front end side and the rear end side. In addition, the coil springs 71 that are extension springs are respectively stretched between the weight locking portions 84 and the housing locking portions 30*b*. In this embodiment, at the initial neutral position when an external force is not in effect, the housing locking portion 30*b* and the weight locking portion 84 are on the same normal line of the rotational support axle 72. Moreover, at the initial neutral position, the housing locking portions 30*b* and the weight locking portions 84 on the front end side and the rear end side are in a linearly symmetrical arrangement with respect to the line connecting the gravity center G and the axle center of the rotational support axle 72. As shown in FIG. 8(*b*), when the weight 80 swings from the initial neutral position shown in FIG. 8(*a*) toward a front end direction, the coil springs 71 on the front end side and the rear end side extend. As a consequence, urging forces of the coil springs 71 on the front end side and the rear end side in the directions returning to the initial neutral position become effective to the weight 80. Moreover, as shown in FIG. 8(*c*), the same situation applies when the weight 80 swings toward a rear end direction. According to the configuration, as shown in FIG. 8(*d*), a variation (stretching rate) of the coil spring 71 increases as the weight 80 becomes more distant from the initial neutral position. Besides, length variations of the coil springs 71 on the front end side and the rear end side that swing with the weight 80 are often the same within a swinging range. No matter the weight swings toward which of the front end side and the rear end side, expansion rates of the coil springs 71 per unit angle are the same. Thus, a difference (difference in length) between a maximum and a minimum of a load applied to the coil spring 71 is reduced, and a lifetime of the coil spring 71 may be extended. Besides, in this embodiment, two coil springs 71 are disposed to the right end side and the rear end side. However, there may be only one coil spring 71 or three or more coil springs 71 disposed. The number of the coil springs 71 may be appropriately determined based on an intensity or a frequency of the vibrations to be absorbed. Furthermore, in this embodiment, at the initial neutral position, the housing locking portions 30*b* and the weight locking portions 84 are configured by being disposed to the positions lineally symmetrical with respect to the line connecting the gravity center G and the axle center of the fixing hole 81. The linearly symmetrical positions are not subject to limitation as long as the housing locking portions 30*b* and the weight locking portions 84 are disposed on the same normal lines of the rotational support axle 72. Whichever positions the housing locking portions 30*b* and the weight locking portions 84 are disposed, the expansion rates per unit angle of the coil springs 71 may remain the same. Thus, a design flexibility may be ensured.

Besides, with respect to FIGS. 8(*a*) to 8(*c*), in a swing direction of the weight 80, a structure where a portion of the coil spring 71 is located within the area of the weight 80 is formed. Accordingly, in the swing direction of the weight 80, the vibration-reducing mechanism 70 may be more compact, and may be disposed by simply utilizing the small space formed between the gear housing 30 and the external housing 50.

Figure 10:
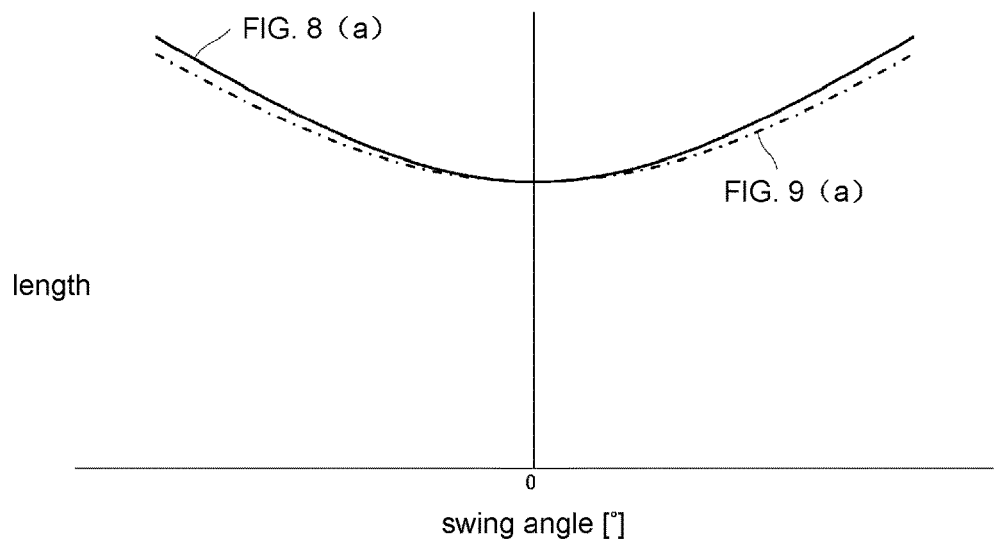
FIG. 10 is a diagram illustrating a swing angle of a coil spring shown in FIG. 3 and a corresponding total length.

FIGS. 9(*a*)~9(*d*) illustrates an example where the housing locking portion 30*b* is disposed to a position different from that in FIGS. 8(*a*)~8(*d*). The housing locking portion 30*b* and the weight locking portion 84 are not disposed on the same normal line of the rotational support axle 72, and an interval between two housing locking portion 30*b* is reduced. Under this circumstance, at the initial neutral position when an external force is not in effect, a direction of the line connecting a gravity center of a weight 80*d* and the axle center of the rotational support axle 72 and an urging direction of the coil spring 71 are substantially the same. Based on the configuration, the example is the same as the example shown in FIGS. 8(*a*)~8(*d*) in that, when swinging, the urging forces in the directions of making the weight 80 return to the initial neutral position by using the coil springs 71 on the front end side and the rear end side become effective, and that the variation of the coil spring 71 increases as the weight 80 becomes more distant from the initial neutral position. However, compared with the configuration of FIGS. 8(*a*)~8(*d*), the interval between the case locking portions 30*b* becomes more reduced, so the vibration-reducing mechanism 70 may be more compact. Besides, as shown in FIG. 9(*b*), when the weight 80 swings toward the front end direction, compared to the coil spring 71 on the rear end side, the coil spring 71 on the front end side 71 expands to a greater extent. As shown in FIG. 9(*c*), when the weight 80 swings toward the rear end direction, compared with the coil spring 71 on the front end side, the coil spring 71 on the rear end side expands to a greater extent. Thus, compared with the example shown in FIGS. 8(*a*)~8(*d*), where the housing locking portion 30*b* and the weight locking portion 84 are disposed on the same normal line of the rotational support axle 72, the difference (difference in length) between the maximum and the minimum of the load applied to the coil spring 71 becomes greater, as shown in FIG. 9(*d*), so the coil spring 71 becomes burdened. In FIG. 9(*d*), the initial neutral position is a position where a swing angle is 0 degrees. At the initial neutral position, the housing locking portions 30*b* and the weight locking portions 84 are respectively disposed at the positions linearly symmetrical to the line connecting the gravity center G and the axle center of the fixing hole 81. Therefore, a total length of the coil springs 71 on the front end side and the rear end side is as shown by a dashed line shown in FIG. 10. No matter the weight swings toward which side of the front end side and the rear end side, the expansion rates per unit angle of the coil springs 71 may remain the same. In FIG. 10, the initial neutral position is a position where the swing angle is 0 degrees. Besides, a solid line shown in FIG. 10 represents the total length of the coil springs 71 on the front end side and the rear end side in the embodiment shown in FIGS. 8(*a*)~8(*d*). The lines are curved lines that are substantially the same.

FIG. 10 illustrates a circumstance when the coil spring 71 as an extension spring is used, as in the embodiment. Regarding the variation of the coil spring 71, the swing direction of the weight 80 and a stretching direction of the coil spring 70 as an urging means are different. Therefore, the more distant the weight 80 from the initial neutral position and the greater the swing angle, the larger the variation of the coil spring 71 becomes. Consequently, as shown in a solid line in FIG. 11(*a*), a moment [N·m] where the urging force using the coil spring 71 is applied to the weight 80 exhibits a non-linear relation with respect to the swing angle of the weight 80. Also, as shown in a solid line in FIG. 11(*b*), a variation of the moment where the urging force using the coil spring 71 is applied to the weight 80 also exhibits a non-linear relation with respect to the swing angle of the weight 80.

Figure 11A:
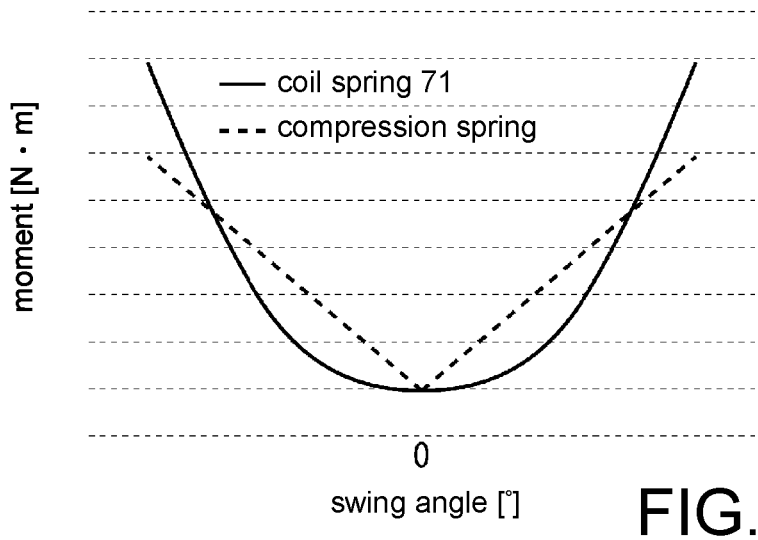
FIGS. 11(a)~11(c) is a diagram illustrating a moment of the weight shown in FIGS. 3 and 4 and a variation of the moment.
Figure 11B:
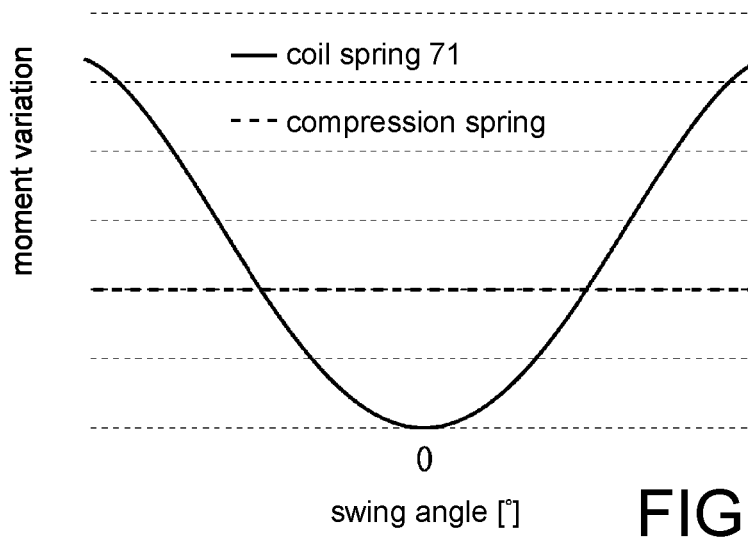
Figure 11C:
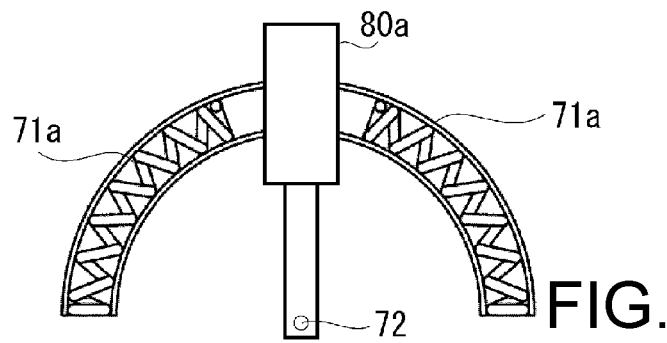
Figure 12A:
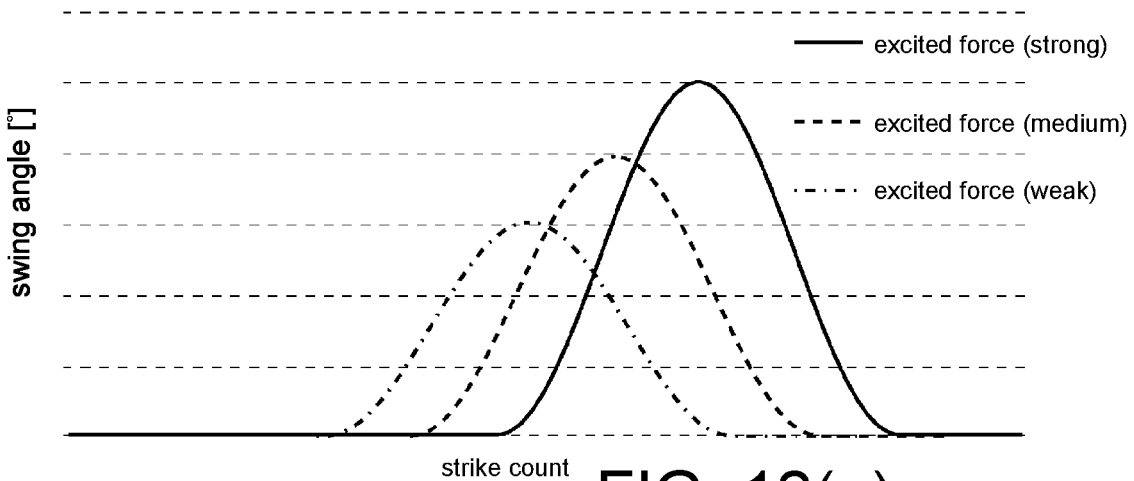
FIGS. 12(a)~12(b) is a diagram illustrating a frequency band for vibration damping of the first embodiment of the work tool of the invention.
Figure 12B:
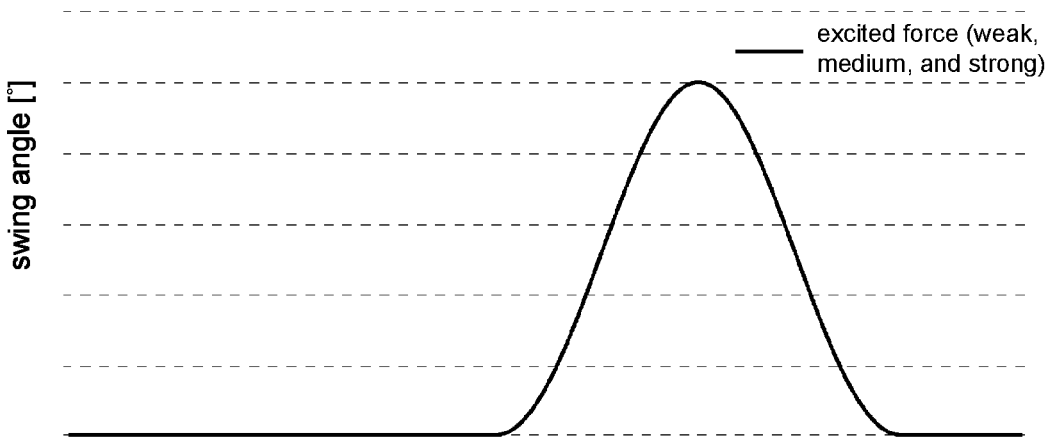

Broken lines in FIGS. 11(*a*) and 11(*b*) represent the moment [N·m] where a compression spring 71*a* is used as an urging means urging a weight 80*a*, as shown in FIG. 11(*c*), with respect to the swing angle and a variation thereof. When the compression spring 71*a* is used, as shown in the broken line in FIG. 11(*a*) representing the moment where an urging force using the compression spring 71*a* is applied to the weight 80*a*, the moment exhibits a linear relation with respect to a swing angle of the weight 80*a*. Also, as shown in the broken line in FIG. 11(*b*) representing a variation of the moment where the urging force using the compression spring 71*a* is applied to the weight 80*a*, the variation is constant and irrelevant of the swing angle of the weight 80*a*. Thus, a resonance frequency determined by the compression spring 71*a* also becomes constant. Thus, as shown in FIG. 12(*b*), vibrations being subjected to vibration damping simply exhibit a frequency band having a fixed width and centering at the fixed resonance frequency determined by the compression spring 71*a*. In a case when a rotation speed control is exerted but the frequencies of vibrations are different, a vibration damping effect is reduced. Comparatively, when the coil spring 71 as an expansion spring is used, the variation of the moment per unit angle is not constant. As the swing angle increases, the resonance frequency also increases. Thus, as shown in FIG. 12(*a*), vibrations being subjected to vibration damping may have respective frequency bands having fixed widths and centering at the variable resonance frequencies. Thus, a vibration damping effect corresponding to rotation speed control may be obtained.

Figures 13A, 13B, 13C:
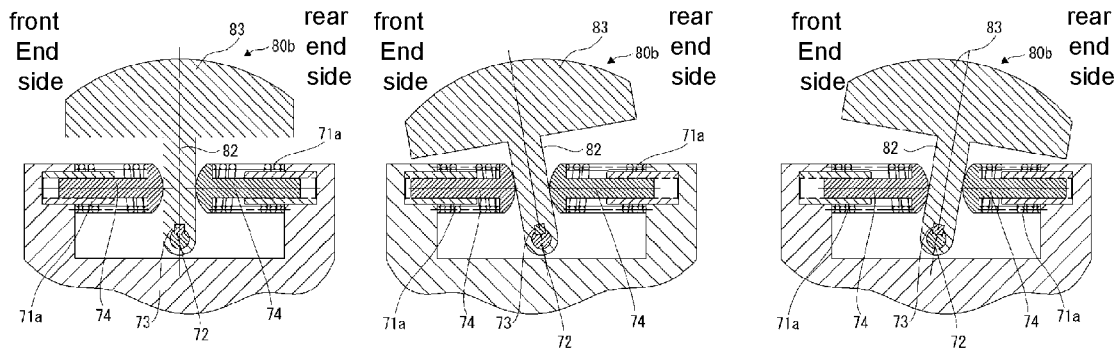
FIGS. 13(a)~13(c) is a view illustrating a first example where a compression spring is used as an urging means urging the weight shown in FIGS. 3 and 4.
Figure 14A:
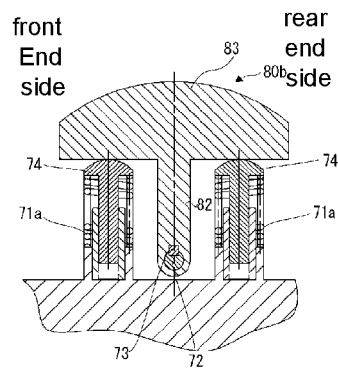
FIGS. 14(a)~14(c) is a view illustrating a second example where a compression spring is used as the urging means urging the weight shown in FIGS. 3 and 4.
Figure 14B:
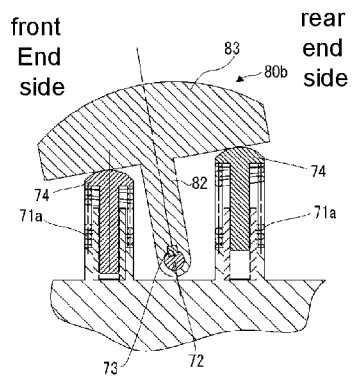
Figure 14C:
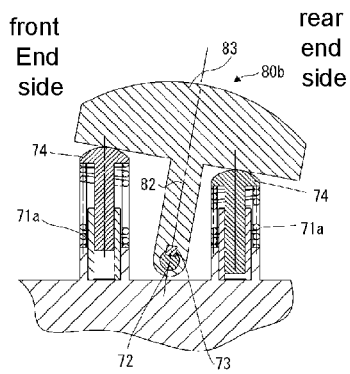

Besides, in this embodiment, the weights 80 disposed to the two sides of the gear housing 30 are connected by the rotational support axle 72 to achieve an integral configuration. Therefore, even if the compression spring 71*a*, in replacement of the coil spring 71 as an extension spring, is used as the urging means urging the weight 80 to return to the initial neutral position, a fixing effect still remains. FIG. 13(*a*) illustrates an example described in the following. In the example, the compression springs 71*a* are used to press pins 74 having abutting ends on arcs respectively from the front end side and the rear end side to the support portion 82 of a weight 80*b*. An urging direction of the compression spring 71*a* is a direction of the axle center of the piston 42 functioning as a portion of the striking mechanism. As shown in FIG. 13(*b*), when the weight 80*b* swings toward the front end direction, the compression spring 71*a* on the front end side is pressed and contracted, and urges to make the weight 80*b* to return to the initial neutral position. As shown in FIG. 13(*c*), when the weight 80*b* swings toward the rear end direction, the compression spring 71*a* is pressed and contracted, and urges to make the weight 80*b* to return to the initial neutral position. FIG. 14(*a*) illustrates an example described in the following. In the example, the compression springs 71*a* are used to press the pins 74 having the abutting ends on the arcs respectively from the front end side and the rear end side to the weight portion 83 of the weight 80*b*. The urging direction of the compression spring 71*a* is a direction substantially orthogonal to the axle center of the piston 42 functioning as a portion of the striking mechanism. As shown in FIG. 14(*b*), when the weight 80*b* swings toward the front end direction, the compression spring 71*a* on the front end side is pressed and contracted, and urges to make the weight 80*b* to return to the initial neutral position. As shown in FIG. 14(*c*), when the weight 80*b* swings toward the rear end direction, the compression spring 71*a* is pressed and contracted, and urges to make the weight 80*b* to return to the initial neutral position.

Second Embodiment

Figure 15:
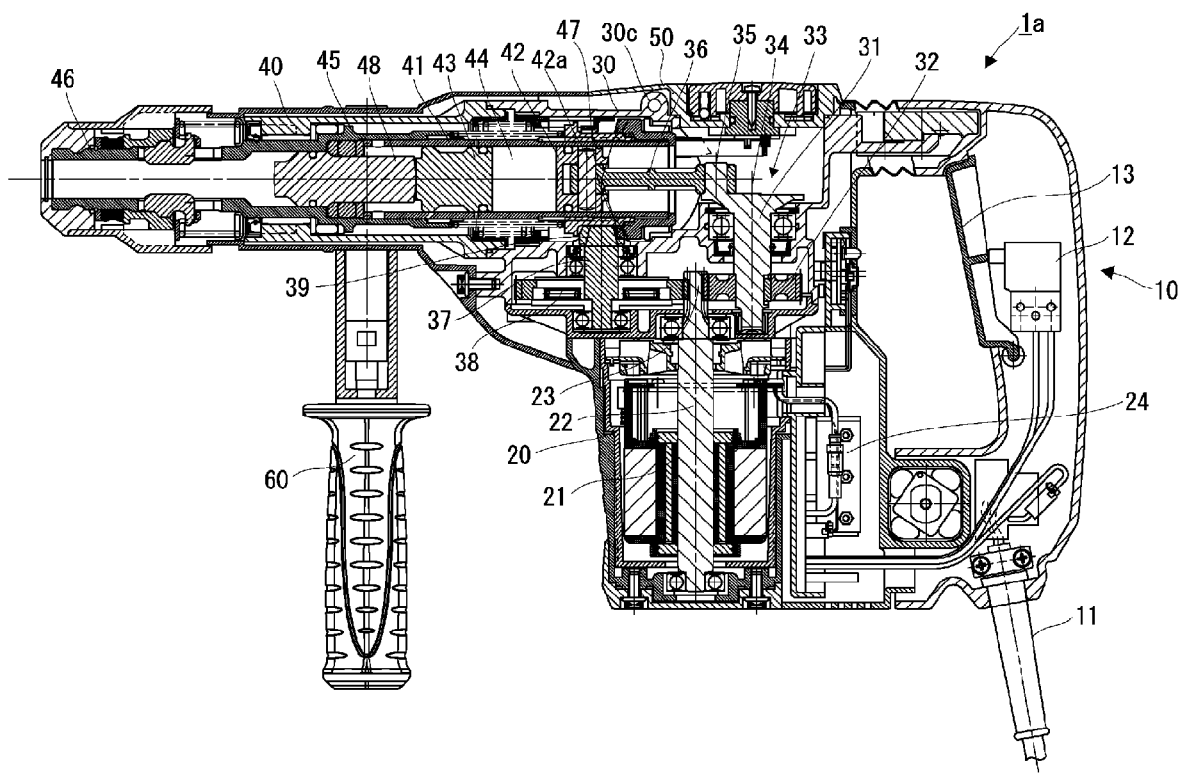
FIG. 15 is a longitudinal cross-sectional view illustrating an overall assembly of a second embodiment of the work tool of the invention.
Figure 16:
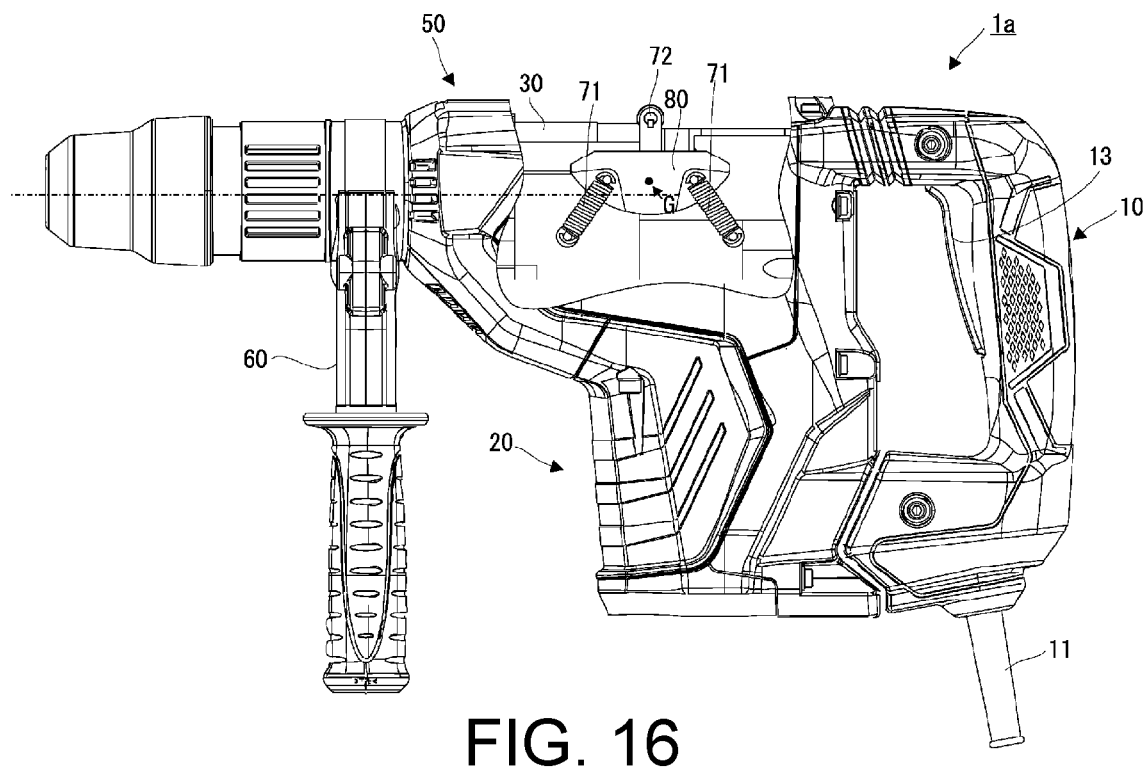
FIG. 16 is a side view illustrating a vibration-reducing mechanism included in the work tool of the second embodiment.

In a work tool 1*a* of the second embodiment, as shown in FIG. 15, a rotational support hole 30*c* is formed on an upper surface of the gear housing 30, and, as shown in FIG. 16, the rotational support axle 72 is rotatably supported by the rotational support hole 30*c* to be able to rotate. Rest of the configuration is the same as that of the first embodiment.

According to the second embodiment, no through hole 30*a* needs to be disposed in the gear housing 30. The gear housing 30 accommodates the movement conversion mechanism 33 or the rotation transmission mechanism, so a position for forming the through hole 30*a* is limited. Comparatively, in the second embodiment, the rotational support hole 30*c* may be formed on any position on the upper surface of the gear housing 30. Therefore, the design flexibility may be ensured.

Third Embodiment

Figure 17:
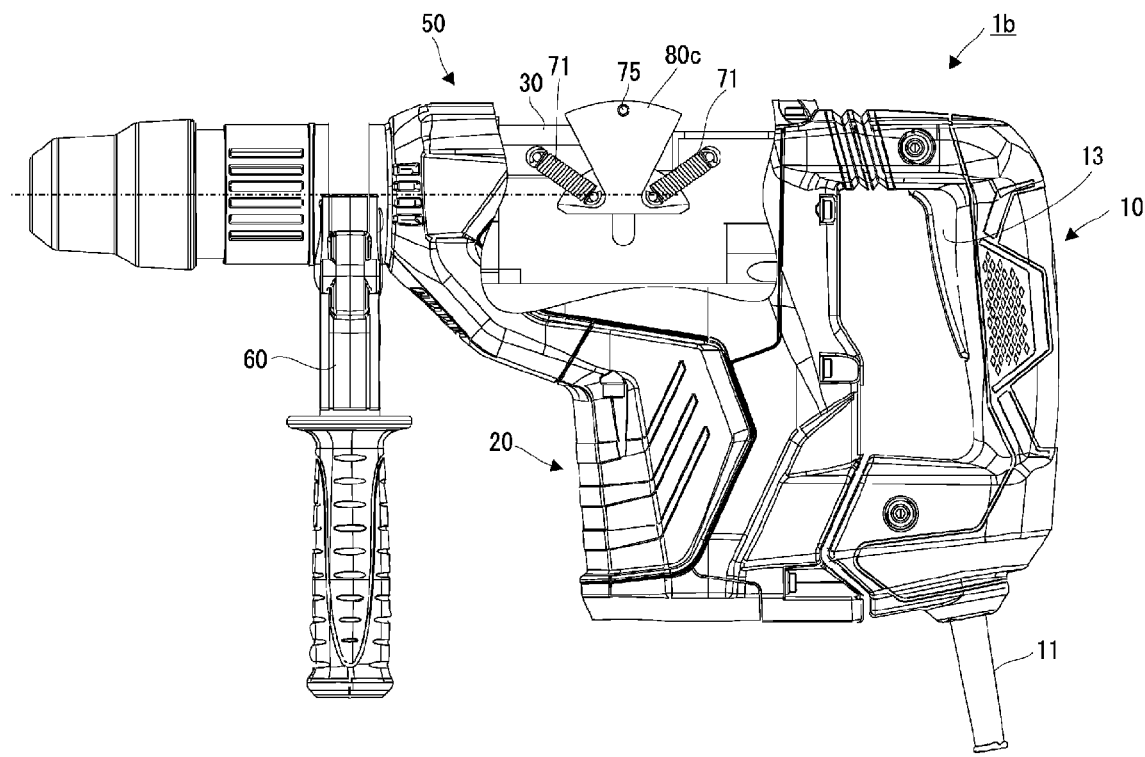
FIG. 17 is a side view illustrating a vibration-reducing mechanism included in the work tool of a third embodiment.
Figure 18:
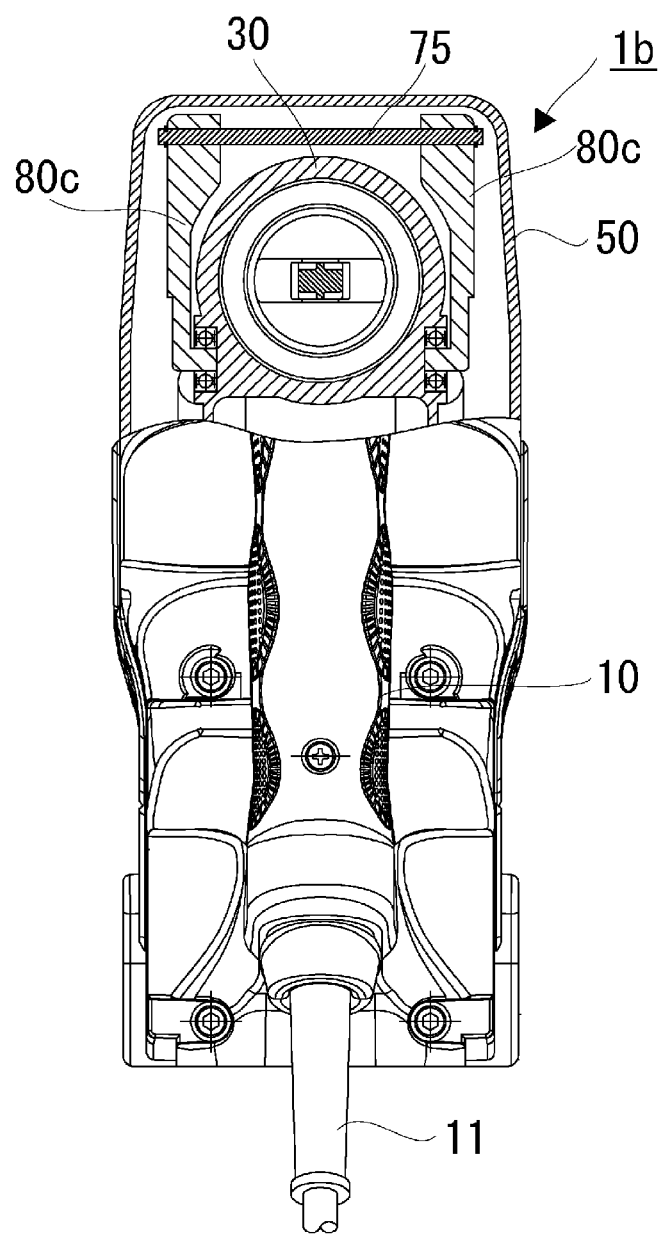
FIG. 18 is a rear view illustrating the vibration-reducing mechanism included in the work tool of the third embodiment.

In a work tool 1*b* of the third embodiment, as shown in FIGS. 17 and 18, one ends weights 80*c* respectively disposed to the two sides of the gear housing 30 are rotatably supported by the gear housing 30. In addition, another ends of the weights 80*c* extend beyond and protrude from the upper surface of the gear housing 30. The another ends of the weights 80*c* respectively disposed to the two sides are connected by a connection stick 75.

According to the third embodiment, no through hole 30*a* penetrating through the gear housing 30 needs to be disposed. The gear housing 30 accommodates the movement conversion mechanism 33 or the rotation transmission mechanism, so the position for forming the through hole 30*a* is limited. Comparatively, in the third embodiment, it only requires that a bearing or an indicator axle disposed to the side surface of the gear bearing 30 to support the weight 80*c* to be rotatable. Therefore, the design flexibility may be ensured.

Fourth Embodiment

Figure 19:
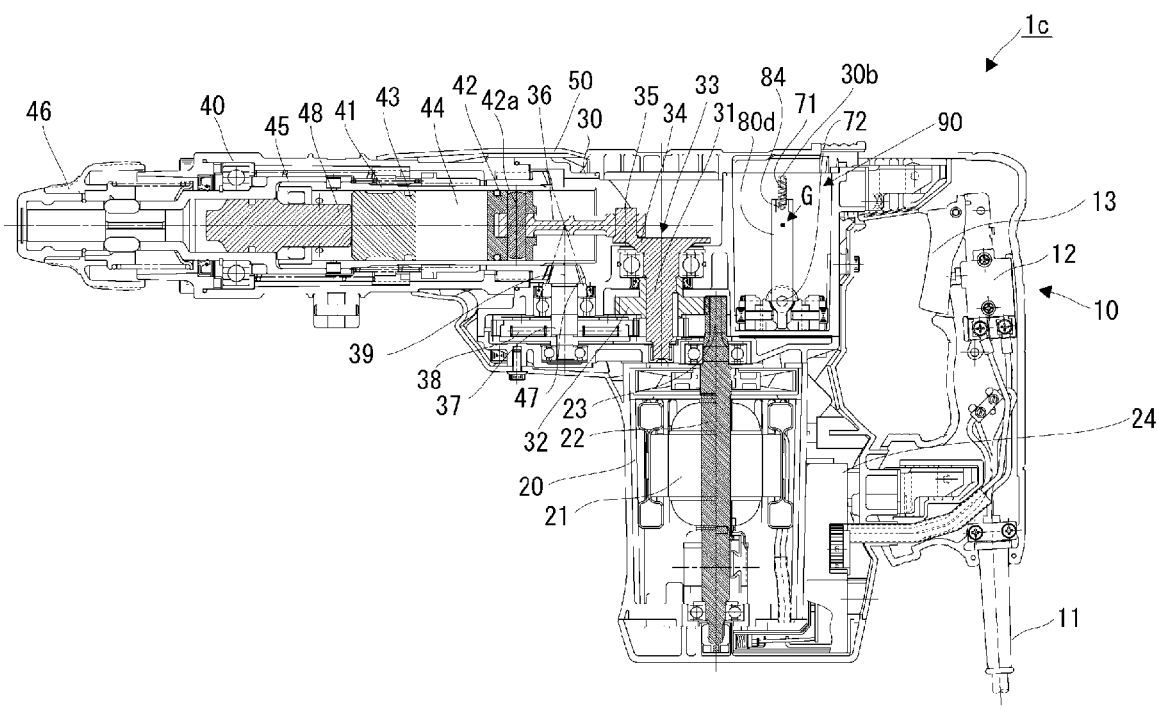
FIG. 19 is a longitudinal cross-sectional view illustrating an overall assembly of a fourth embodiment of the work tool of the invention.

In a work tool 1*c* of the fourth embodiment, as shown in FIG. 19, in the gear housing 30, on the front end side of the pinion gear 23, the crank axle 31 extending in parallel with the output axle 22 is rotatably supported. Moreover, in the gear housing 30, on the front end side of the crank axle 31, the rotational transmission axle 37 extending in parallel with the output axle 22 is rotatably supported, and the second gear 38 engaged with the first gear 32 of the crank axle 31 is coaxially fixed to the lower end of the rotational transmission axle 37.

A vibration-reducing chamber 90 is formed on the rear end side of the pinion gear 23 in the gear housing 30. The vibration-reducing chamber 90 accommodates a weight 80*d* having an end portion rotatably supported by the rotational support axle 72 orthogonal to the axle center of the cylinder 41. On another end side of the weight 80*d*, the weight locking portion 84 is disposed. Moreover, in the vibration-reducing chamber 90, the housing locking portion 30*b* is disposed outside a range of rotation of the weight 80*d* and vertically above the rotational support axle 72. In addition, the coil spring 71 as an extension spring is stretched between the weight locking portion 84 and the housing locking portion 30*b*. In a state when an external force is not in effect, as shown in FIG. 19, the weight 80 is located at the initial neutral position where the line connecting the gravity center of the weight 80*d* and the axle center of the support axle 72, and the initial neutral position is substantially orthogonal with respect to the axle center of the rotational cylinder 45. In a state where the weight 80*d* is located at the initial neutral position, the housing locking portion 30*b* and the weight locking portion 84 are disposed on the same normal line of the rotational support axle 72.

As described above, according to the embodiments, the work tool 1 of the invention has the electric motor 21; a power transmission means (the movement conversion mechanism 33 or the rotational transmission mechanism) receiving the motive power of the electric motor 21 and transmitting the motive power to the tip tool; the gear housing 30, accommodating at least a portion of the power transmission means; the weights 80, swingably supported by the gear housing 30; and the coil springs 71 functioning as the urging means, wherein the urging means urge the weights 80 such that the weights 80 are located at the initial neutral position, the weights 80 and the coil springs 71 are respectively disposed to the two sides of the gear housing 30 to put the power transmission means therebetween, and the work tool 1 includes: the rotational support axle 72 functioning as the connection means that connects the weights 80 respectively disposed to the two sides of the gear housing 30 to swing integrally. According to the configuration, even if the vibration-reducing mechanism 70 is disposed to the side surface of the gear housing 30 to reduce the total length of the device, the weights 80 disposed to the two sides of the gear housing 30 may swing integrally through the rotational support axle 72. Therefore, the vibration damping effect is ensured.

Furthermore, according to the embodiments, the rotational support axle 72 is an axle component that swingably supports the weights 80 respectively disposed to the two side surfaces of the gear housing 30. According to the configuration, without additional configuration, the axle component swingably supporting the weights 80 may be used to integrate the weights 80 disposed to the two sides of the gear housing 30.

Moreover, according to the embodiment, the rotational support axle 72 is rotatably supported by the through hole 30*a* formed at the gear housing 30. The rotational support axle 72 and the weights 80 are supported unrotatably in the swing direction. According to the configuration, a simple configuration may be used to integrate the weights 80 on the two sides of the gear housing 30.

In addition, according to the embodiments, the power transmission means includes: the movement conversion mechanism 33 that transmits the reciprocal movement to the tip tool; and the rotational transmission mechanism that transmits the rotational driving force to the tip tool. When observed from the side surface, the rotational support axle 72 is disposed between the movement conversion mechanism 33 and the rotational transmission mechanism. According to the configuration, the rotational support axle 72 may penetrate through a space in the gear housing 30.

Moreover, according to the embodiments, it is configured such that the variation of the urging means (the coil spring 71) urging the weight 80 is greater as the weight 80 becomes more distant from the initial neutral position.

According to the configuration, when weaker vibrations are generated, the weights 80 may sufficiently swing to damp the vibrations. Also, when stronger vibrations are generated, the swinging of the weights 80 may also be kept up. Thus, regardless of the strength of the vibrations, the vibrations may be damped in a preferable efficiency. Besides, the variation of the moment per unit angle is not constant. As the swing angle increases, the resonance frequency also increases. Therefore, the vibrations being subjected to vibration damping may cope with the frequency bands having fixed widths and centering at the variable resonance frequencies. Since it is not a low vibration mechanism merely coping with one rotation speed of the motor, the vibration damping may still come into effect to cope with multiple rotation speeds even if the rotation speed control is exerted.

In addition, according to the embodiments, the coil spring 71 has the bending portions on the two sides. The bending portions are engaged with the housing locking portion 30*b* disposed to the gear housing 30 and the weight locking portion 84 disposed to the weight 80.

Moreover, according to the embodiments, two of the coil springs 71 and two of the weight locking portions 84 are disposed to one side and another side of the weight 80 in the axial direction of the tip too. In addition, the two coil springs 71 are disposed to stretch when the weight 80 swings. Besides, when the weight 80 is at the initial neutral position, the two coil springs 71 and weight locking portions 84 are disposed to be linearly symmetrical by using the line connecting the rotational support axle 72 and the gravity center of the weight 80 as a symmetry axis.

Furthermore, according to the embodiments, regarding the weight 80, the support portion 82 swingably supporting an end portion by using the connection means and the fan-shaped weight portion 83 disposed to another end side of the support portion 82 are integrated. Also, the weight locking portion 84 is disposed to the thinner thickness portion 85. According to the configuration, the vibration damping mechanism 70 may be more compact, and the vibration damping mechanism 70 may be disposed by simply utilizing the small space formed between the gear housing 30 and the external housing 50.

Moreover, according to the embodiments, two of the housing locking portions 30 are disposed to one side and another side of the weight 80 in the axial direction of the tip tool. When the weight 80 is located at the initial neutral position, the weight locking portions 84 and the house locking portions 30*b* are located on the normal lines of the rotational support axle 72.

In addition, according to the embodiments, in the axial direction of the rotational support axle 72, the coil spring 71 is located within the thickness of the weight 80. According to the configuration, compared with the weight 80, the coil spring 71 does not protrude toward the axial direction the rotational support axle 72. Therefore, the vibration damping mechanism 70 may be more compact in the axial direction of the rotational support axle 72. Thus, the vibration damping mechanism 70 may be disposed by simply utilizing the small space formed between the gear housing 30 and the external housing 50.

Furthermore, according to the embodiments, in the swing direction of the weight 80, a portion of the coil spring 71 is located within the thickness of the weight 80. According to the configuration, in the swing direction of the weight 80, the damping mechanism 70 may be more compact, and the vibration damping mechanism 70 may be disposed by simply utilizing the small space formed between the gear housing 30 and the external housing 50.

Also, according to the embodiments, the weight 80 and the coil spring 71 are disposed between the gear housing 30 and the external housing 50. According to the configuration, the weights 80 and the coil springs 71 disposed to the two sides of the gear housing 30 are covered by the external housing 50. Therefore, an external influence on an operation of the coil springs 71 may be reduced.

In view of the foregoing, the invention is described based on the foregoing embodiments. However, it should be understood that the invention is not limited to the foregoing embodiments, and various changes and modifications may be made without departing from the spirit of the invention. For example, in the embodiments, an example where the work tool is applied to be the hammer drill as a striking tool is described. However, the invention may also be applied to be a tool having a configuration that makes the tip tool move reciprocally. An example of such tool includes a hammer, a knife saw, a jigsaw, or the like, for example. Moreover, in the embodiments, an example where the weights 80 are disposed to the left and right sides of the gear housing 30 is described. However, the weights 80 may also be respectively disposed to upper and lower sides of the gear housing 30 or be disposed inclinedly, so as to put the axle center of the cylinder 41 therebetween. Furthermore, in the embodiments, an example where the weights 80 are disposed to the left and right sides of the gear housing 30 is described. However, the weights 80 may be disposed to two sides of the strike housing 40, so as to put the axle center of the cylinder 41 therebetween.

SYMBOL DESCRIPTIONS

1, 1*a*, 1*b*, 1*c*: work tool
10: main handle portion
11: electric cable
12: switch mechanism
13: trigger
20: motor housing
21: electric motor
22: output axle
23: pinion gear
30: gear housing
31*a*: through hole
30*b*: housing locking portion
30*c*: rotational support hole
31: crank axle
32: first gear
33: movement conversion mechanism
34: crank weight
35: crank pin
36: conrod
37: rotational transmission axle
38: second gear
39: first bevel gear
40: strike housing
41: cylinder
42: piston
42*a*: piston pin
43: striking piece
44: air chamber
45: rotational cylinder
46: tool maintaining portion
47: second bevel gear
48: intermediate piece
50: external housing
60: sub-handle portion
70: vibration-reducing mechanism
71: coil spring
71*a*: compression spring
72: rotational support axle
72*a*: key groove
73: key
74: pin
75: connection stick
80, 80*a*, 80*b*, 80*c*, and 80*d*: weight
81: fixing hole
81*a*: key groove
82: support portion
83: weight portion
84: weight locking portion
85: thinner thickness portion
90: vibration-reducing chamber

What is claimed is:

1. A work tool, comprising:
   a motor;
   a power transmission receiving motive power of the motor and transmitting the motive power to a tip tool which extends in a first axial direction to move to and fro;
   a housing accommodating at least a portion of the power transmission;
   a plurality of weights swingably supported by the housing;
   at least one urging member urging each of the plurality of weights such that the plurality of weights are located at an initial neutral position; and
   an axle component extending along a swing axis;
   wherein the plurality of weights are respectively disposed on opposing sides of the housing such that the power transmission is located between the plurality of weights,
   wherein the axle component connects the plurality of weights respectively disposed to the two sides of the housing, such that the plurality of weights swing integrally about the swing axis,
   wherein the axle component connects the plurality of weights with a keyed connection,
   wherein the motor has an output axle extending along a second axial direction,
   wherein the power transmission comprises a movement conversion mechanism that transmits a reciprocal force to the tip tool to make a reciprocal movement and a rotational transmission mechanism that transmits a rotational driving force to the tip tool,
   wherein the movement conversion mechanism has a crank axle and the rotational transmission mechanism includes a rotational transmission axle,
   wherein the crank axle extends along a third axial direction, and the rotational transmission axle extends along a fourth axial direction, wherein the second axial direction, the third axial direction, and the fourth axial direction are each substantially parallel to one another,
wherein the first axial direction is substantially orthogonal to each of the second axial direction, the third axial direction, and the fourth axial direction,
wherein the swing axis is substantially orthogonal to each of the first axial direction, the second axial direction, the third axial direction, and the fourth axial direction, and
wherein the swing axis and the second axial direction are disposed between the third axial direction and the fourth axial direction.

2. The work tool as claimed in claim 1, wherein:
the at least one urging member is at least one coil spring.

3. The work tool as claimed in claim 2, wherein:
the at least one coil spring has bending portions on two sides, and the bending portions are engaged with at least one housing locking portion disposed to the housing and at least one weight locking portion disposed to a respective weight of the plurality of weights.

4. The work tool as claimed in claim 3, wherein:
the at least one coil spring are two coil springs and the at least one weight locking portion are two weight locking portions, the two coil springs and the two weight locking portions are disposed to one side and another side of the respective weight direction of the tip tool.

5. The work tool as claimed in claim 4, wherein:
the two coil springs are disposed to simultaneously stretch when the respective weight swings.

6. The work tool as claimed in claim 4, wherein:
the axle component that swingably supports each of the plurality of weights is disposed to two side surfaces of the housing, wherein when the respective weight is located at the initial neutral position, the two coil springs and the two weight locking portions are disposed to be linearly symmetrical by using a line connecting the axle component and the gravity center of the weight as a symmetry axis.

7. The work tool as claimed in claim 3, wherein: each respective weight comprises a support portion and an integral fan-shaped weight portion, the support portion comprising an end portion for swingably supporting the respective weight by connection with the axle component, and the at least one weight locking portion is disposed to a thinner thickness portion of the weight portion.

8. The work tool as claimed in claim 3, wherein:
the axle component that swingably supports each of the plurality of weights is disposed to two side surfaces of the housing, the two housing locking portions are disposed to one side and another side of the respective weight, and wherein when the respective weight is located at the initial neutral position, the at least one weight locking portion and the at least one housing locking portion are located on a normal line of the axle component.

9. The work tool as claimed in claim 2, wherein: the axle component that swingably supports each of the plurality of weights is disposed to two side surfaces of the housing, along the swing axis of the axle component, the at least one coil spring is located at a position overlapping a respective weight, of the plurality of weights, in a direction parallel to the swing axis.

10. The work tool as claimed in claim 2, wherein: in a swing direction of each weight, a portion of the at least one coil spring is located at a position overlapping a respective weight, of the plurality of weights, in a direction parallel to the swing axis.

11. The work tool as claimed in claim 1, wherein:
the housing comprises: an inner side housing accommodating at least a portion of the power transmission and an outer side housing covering the inner side housing, wherein each of the plurality of weights and the respective at least one urging member are disposed between the inner side housing and the outer side housing.

12. The work tool as claimed in claim 1, wherein the axle component, the crank axle and the rotational transmission axle are configured to be closer to the first axial direction than the motor.

13. The work tool as claimed in claim 1, wherein the axle component is disposed between the fourth axial direction and the second axial direction.

14. A work tool, comprising:
a motor;
a power transmission receiving motive power of the motor and transmitting the motive power to a tip tool;
a housing accommodating at least a portion of the power transmission;
a plurality of weights swingably supported by the housing;
an axle component extending along a swing axis; and
urging members coupled to each of the plurality of weights such that each of the plurality of weights are urged towards an initial neutral position,
wherein for the work tool:
the plurality of weights are respectively disposed to two sides of the housing along a horizontal direction of the work tool to dispose the power transmission between the plurality of weights along the horizontal direction,
wherein the axle component connects the plurality of weights respectively disposed to the two sides of the housing, such that the plurality of weights swing integrally about the swing axis,
wherein the urging members of each weight comprises two coil springs,
wherein the two coil springs are disposed such that both of the two coil springs stretch simultaneously when the respective weight swings.

* * * * *